United States Patent [19]

Speer

[11] E Re. 30,842

[45] Reissued Jan. 5, 1982

[54] TENSIONING APPARATUS

[75] Inventor: Billy L. Speer, Springfield, Mo.

[73] Assignee: Dayco Corporation, Dayton, Ohio

[21] Appl. No.: 138,766

[22] Filed: Apr. 9, 1980

Related U.S. Patent Documents

Reissue of:

[64] Patent No.: 3,975,965
Issued: Aug. 24, 1976
Appl. No.: 591,206
Filed: Jun. 27, 1975

[51] Int. Cl.[3] ..... F16H 7/12

[52] U.S. Cl. ..... 474/135; 64/27 NM; 74/411; 403/226; 403/359; 474/94

[58] Field of Search ..... 474/101, 117, 135, 138, 474/94, 902, 903; 403/225, 226, 359; 64/27 NM; 74/411

[56] References Cited

U.S. PATENT DOCUMENTS

| | | | |
|---|---|---|---|
| 1,370,006 | 3/1921 | Cook | 474/115 |
| 2,073,158 | 3/1937 | Kindl et al. | 74/242.13 |
| 2,087,253 | 7/1937 | Herold | 248/592 |
| 2,119,397 | 5/1938 | Morrill | 248/23 |
| 2,994,213 | 8/1961 | Arnold et al. | 64/27 NM |
| 3,274,841 | 9/1966 | Roberts | 74/242.13 |
| 3,380,314 | 4/1968 | Halsted | 74/228 |
| 3,702,570 | 11/1972 | Stikkers | 74/242.15 R |
| 3,741,499 | 6/1973 | Osborn | 242/201 |
| 3,817,113 | 6/1974 | Pfarrwaller | 74/242.1 R |
| 3,859,821 | 1/1975 | Wallace | 64/27 NM |
| 3,922,927 | 12/1975 | Shiki et al. | 74/242.13 R |
| 4,031,761 | 6/1977 | Fisher et al. | 74/15.63 |

FOREIGN PATENT DOCUMENTS

| | | | |
|---|---|---|---|
| 904843 | 2/1954 | Fed. Rep. of Germany . | |
| 585102 | 1/1947 | United Kingdom . | |
| 262556 | 3/1968 | U.S.S.R. | 64/27 NM |

*Primary Examiner*—C. J. Husar
*Assistant Examiner*—Conrad Berman
*Attorney, Agent, or Firm*—Charles E. Bricker

[57] ABSTRACT

A tensioning apparatus for an endless power transmission device is provided and utilizes the elastic properties of an elastomeric material to provide the tensioning action and such apparatus is supported adjacent the endless power transmission device to be tensioned and has components thereof operatively associated with the elastomeric material and with the device.

33 Claims, 10 Drawing Figures

TENSIONING APPARATUS

Matter enclosed in heavy brackets [ ] appears in the original patent but forms no part of this reissue specification; matter printed in italics indicates the additions made by reissue.

BACKGROUND OF THE INVENTION

*1. Field of the Invention*

*This invention relates to a tensioning apparatus of the idler roller type for endless power transmission devices, such as, endless belts, sprocket chains, timing belts, and the like.*

*2. Prior Art Statement*

In numerous applications where endless power transmission devices are employed it is often desirable or necessary to control the tension in such devices during movement thereof around associated sheaves, pulleys, sprockets or the like, to assure optimum operating efficiency.

For example, in the automobile industry where a single endless power transmission belt is used to drive various automobile accessories, a belt tensioning device is required to assure satisfactory performance of the accessories as well as assure satisfactory service life of the belt.

Numerous tensioning devices such as belt tensioning devices have been proposed heretofore and most of these devices employ metal spring devices, hydraulic devices, or pneumatic devices to provide the tensioning action whereby such devices are comparatively complicated and expensive and require considerable maintenance.

*It has also been proposed heretofore to employ rubber under loaded or stressed conditions as a resilient spring means in various applications, including tensioning apparatus for endless power transmission devices. However, rubber thus used heretofore has either resulted in comparatively complicated and expensive tensioning apparatus or in such apparatus which requires a skilled mechanic to install same on associated equipment to assure satisfactory performance of such equipment and the tensioning apparatus.* Accordingly, there is a need for a simple and inexpensive tensioning apparatus *for an endless power transmission device* capable of providing reliable performance over an extended service life *and capable of being installed on associated equipment by a comparatively unskilled person.*

SUMMARY

Accordingly, one embodiment of this invention provides a tensioning apparatus for an endless power transmission belt and a belt system using same wherein such tensioning apparatus comprises an elastomeric material, means supporting the elastomeric material adjacent an associated power transmission belt, and means operatively associating with the elastomeric material and the power transmission belt and employing the elastic properties of the elastomeric material to exert a controlled tensioning force against the belt.

It is a feature of this invention to provide a simple, economical, and reliable belt tensioning apparatus capable of operating maintenance free over an extended service life and which is particularly adapted to be used in lieu of complicated tensioning apparatus proposed heretofore.

Another feature of this invention is to provide a tensioning apparatus capable of being used with endless belts of all types, sprocket chains, timing belts, and similar endless devices.

Accordingly, it is an object of this invention to provide an improved belt tensioning apparatus and belt system using same and an improved combination of endless device and tensioning apparatus having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention in which.

DESCRIPTION OF ILLUSTRATED EMBODIMENTS

Figure 1:
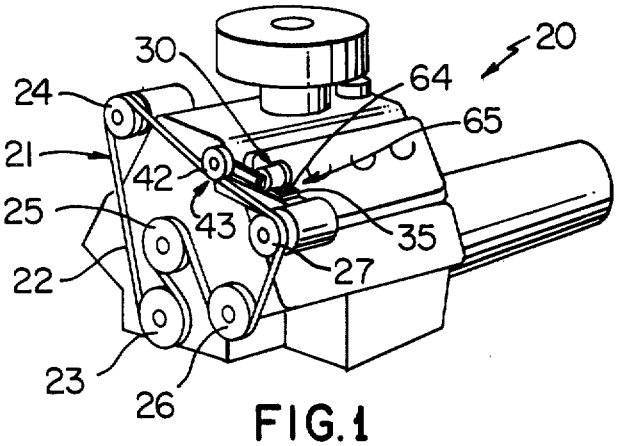
FIG. 1 is a perspective view illustrating one exemplary embodiment of an endless power transmission belt drive system used on an internal combustion engine such as an automobile engine with such belt drive system using one exemplary embodiment of the belt tensioning apparatus of this invention to provide a controlled tension in its associated belt.

Reference is now made to FIG. 1 of the drawings which illustrates a prime mover or an internal combustion engine in the form of an automobile engine 20 which utilizes an endless power transmission belt drive system 21 and such drive system 21 comprises a single endless power transmission belt 22 and a plurality of five belt pulleys or sheaves including a driving sheave 23 and a plurality of driven sheaves which are designated by the reference numerals 24, 25, 26, and 27. The sheaves 24–27 are suitably operatively connected to associated assemblies or accessories to drive such accessories and in this example the sheaves of the system 21 are constructed and arranged such that the belt 22 operates substantially in a common plane. The engine 20 and hence drive system 21 utilizes one exemplary embodiment of a belt tensioning apparatus of this invention which is designated generally by the reference numeral 30.

Figure 2:
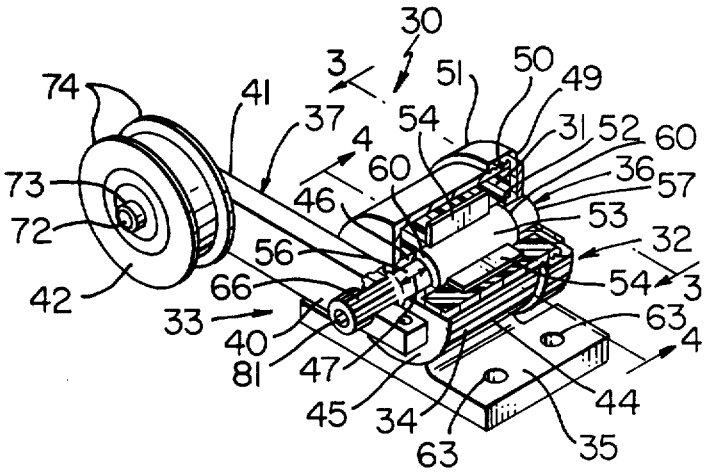
FIG. 2 is a perspective view with parts in cross-section and parts broken away particularly illustrating the exemplary belt tensioning apparatus of FIG. 1.

Referring now to FIG. 2, it will be seen that the apparatus 30 utilizes an elastomeric material 31 and means designated generally by the reference numeral 32 for supporting the elastomeric material adjacent the endless belt 22. Further, the apparatus 30 has means designated generally by the reference numeral 33 operatively associating with the elastomeric material 31 and the belt 22 while employing or utilizing the elastic properties of the elastomeric material 31 to exert a controlled tensioning force against the belt 22.

The means 32 for supporting the elastomeric material 31 comprises a housing 34 which contains the elastomeric material 31, and the manner in which such elastomeric material 31 is introduced and fixed within the housing 34 will be described in detail subsequently. The housing 34 is suitably fixed as by welding, for example, to a supporting flange 35 which in this example defines a supporting base 35 for the apparatus 30 enabling such apparatus to be easily detachably mounted on the engine 31.

The means 33 operatively associating with the elastomeric material and the belt 22 comprises shaft means 36 which is suitably fixed in an embedded manner in the elastomeric material 31, a lever 37 having opposite end portions 40 and 41, and a rotatable belt-engaging roller 42. The end portion 40 of lever 37 is detachably fixed to the shaft means 36 and the roller 42 is rotatably mounted on opposite end portion 41 whereby the roller 42 is particularly adapted to engage the outside surface of the belt 22 to exert a tensioning force thereagainst. In particular, the apparatus 30 is suitably installed on the engine 20 such that the elastomeric material 31 is displaced from a normal relaxed condition thereof by the roller 42 engaging the belt 22. The displaced elastomeric material 31 has elastic properties or an elastic memory and thus it tends to return or move to its normal relaxed or unstressed condition whereby it imparts a force to lever 37 (through shaft means 36) and to the roller 42 causing such roller to engage and deflect the belt 22 inwardly as illustrated at 43 in FIG. 1 and thereby provide a controlled tensioning of such belt.

The housing 34 of the apparatus 30 has a substantially right circular cylindrical main body 44 which is provided with an integral end 45 which in this example, is substantially planar, and the end 45 has an inwardly projecting tubular flange 46 extending within the housing 44 a controlled dimension indicated at 47. The main body 44 has an opposite end portion provided with threads 50 in the form of external threads which are particularly adapted to threadedly receive internal threads of a cap 51 in the manner shown in FIG. 2.

The cap 51 has a flat or substantially planar outside surface 49 and central opening therethrough defined by an inwardly projecting tubular flange 52 which corresponds to the tubular flange 46 extending inwardly into the housing 34 from the opposite wall 45. The purpose of the tubular flanges 46 and 52 will be described subsequently.

The shaft means 36 of this exemplary apparatus 30 comprises a shaft 53 having at least one fin-like projection and in this example a plurality of four fin-like projections or fins 54 which extend from the outer periphery of such shaft 53. The fins 54 are angularly spaced 90° apart and have their inner portions received within associated slots 55 in the shaft 53 and are suitably fixed in position as by welding, or the like. The shaft 53 of the shaft means 36 has reduced diameter opposite end portions 56 and 57 with the reduced diameter portion 56 being received within the tubular flange 46 and the reduced diameter portion 57 being received within the tubular flange 52. The reduced diameter portions 56 and 57 defined parallel annular ledges each designated by the same reference numeral 60 which are particularly adapted to be engaged by the terminal inner edges of the flanges 46 and 52 to prevent axial movement of the shaft means 36 once the cap 51 is threadedly fastened in position.

The flange 35 has a plurality of openings therethrough with each opening being designated by the same reference numeral 63 and each opening is particularly adapted to receive a threaded bolt 64 therethrough, see FIG. 1, and enable fastening of the flange 35 and hence the entire apparatus 30 on the engine 20 as illustrated at 65.

Figure 5:
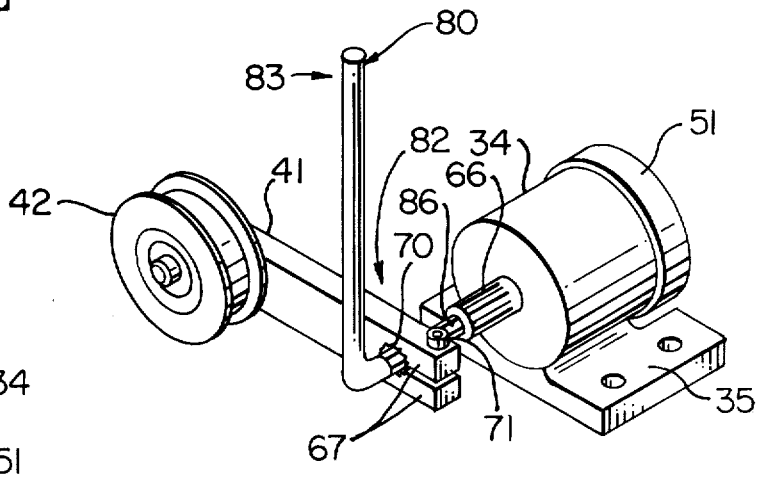
FIG. 5 is a perspective view illustrating the manner in which the belt tensioning apparatus of this invention may be installed or set to provide a controlled tension.

The lever 37 has its end portion 40 detachably fastened to the shaft 53 of the shaft means 36 by means of a splined end portion 66 on the shaft 53 and internally splined arms 67 defining end portion 40. The arms 67 define a bifurcate end having an enlarged opening provided with parallel tooth-like projections 70, see FIG. 5. The projections 70 are particularly adapted to be received within grooves in the splined end portion 66. The arms 67 have a threaded allen screw 71 extending through a plain or smooth opening in the arm 67 adjoining the screw head and a cooperating threaded opening in the remote arm. To fasten the end portion 40 of the lever 37 to the splined end 66 the screw 71 is unthreaded allowing the arms 67 to spring apart whereupon the end portion 40 and lever 37 may be moved axially away from the splined end portion 66. Once it is desired to fasten the lever 37 to the splined end portion 66, the end portion 40 is moved so that the enlarged opening therein receives the splined end portion 66 therethrough whereupon the screw 71 is tightened to fasten the lever 37 and shaft means 36 together.

The lever 37 has roller 42 suitably rotatably supported at its opposite end portion 41 by a shaft-like bolt 72 which has an enlarged head portion 73 and a threaded portion at the opposite end thereof which is threadedly received within a threaded opening provided in the end portion 41. Thus, the roller 42 is prevented from inward axial movement by the lever 37 and is prevented from outward axial movement by the head 73. The roller 42 may be provided with a pair of oppositely arranged side flanges 74 for receiving a belt therewithin.

The apparatus 30 may also be provided with means 75 for indicating the amount of tension being exerted by the elastomeric material 31 and in this example such means is in the form of an arrow 76 which may be provided on the shaft means 36 and in particular on the terminal end of the shaft 53. The tension indicating means includes a scale device 77 which may be suitably fixed in position at the end of the housing 34 associated with the arrow 76. The manner in which the tension indicating means is employed will now be described.

Figure 3:
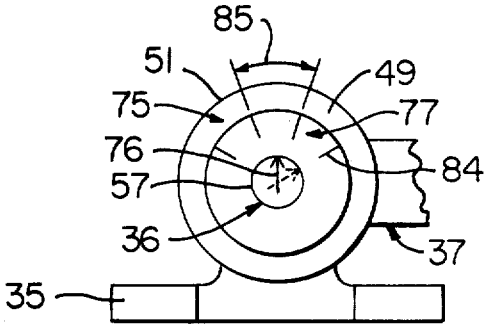
FIG. 3 is a fragmentary view taken essentially on the line 3—3 of FIG. 2.

The housing 34 of apparatus 30 is suitably detachably fixed on the engine 20 using the flange 35 and as illustrated at 65 and with its lever 37 disconnected. In this position the elastomeric material 31 is in its normal relaxed position. A simple L-shaped tool 80, shown in FIG. 5, and having an allen-type end 86 may be employed and inserted within a cooperating opening 81 provided in the splined end portion 66 of the shaft 53 and with the screw 71 unthreaded the arms 67 and lever 37 are moved outwardly along the tool 80 as shown at 82. The tool 80 is then rotated in the direction of the arrow 83 thereby moving the arrow 76 to the dotted line position opposite the scale mark 84 in FIG. 3 to provide a loading or displacement of the material 31 in housing 34 from its normal relaxed condition whereupon the lever 37 is moved so that the arms 67 are positioned around the splined end 66. The threaded screw is then tightened thereby attaching the lever 37 and its roller 42 in position. The tool 80 may then be gradually released allowing the elastic character of the elastomeric material 31 to move the roller 42 into engagement with the belt as illustrated at 43 in FIG. 1. If the belt 22 has the correct tension applied thereagainst the arrow 76 will be within the zone 85 on the scale device. In the event the arrow 76 is not within the zone 85 the tool 80 is again used to remove the lever 37 and roller 42 and the operation is repeated by loading or stressing the elastomeric material more or less, as required, so that once the tool is finally removed the arrow 76 will be within zone 85 indicating the correct precise belt tension is being applied.

The elastomeric material 31 is selected so that when loaded in the manner described above, it will provide the correct tension. For example, it has been found that a urethane elastomer manufactured by E. I. DuPont de Nemours Company of Wilmington, Del., and sold under the trade designation of Adiprene 100 may be used with excellent results when cured to a Shore Durometer hardness of 90 as measured on the A-scale.

It will be appreciated that the elastomeric material 31 may be specially formulated with great precision for each belt tensioning application to provide any desired tension in a controlled acceptable range.

Figure 4:
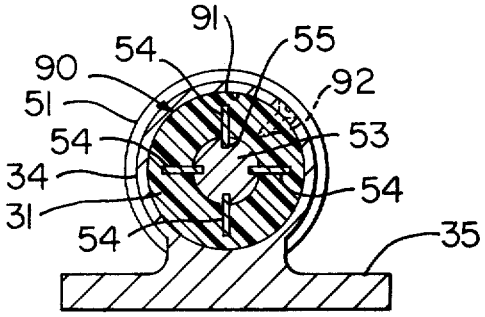
FIG. 4 is a cross-sectional view taken essentially on the line 4—4 of FIG. 2.
Figure 6:
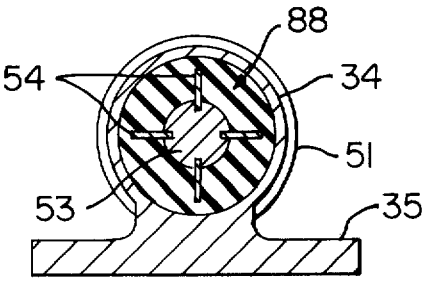
FIG. 6 is a view similar to FIG. 4 illustrating a modification of the apparatus of this invention.

The belt tensioning apparatus 30 is shown in FIGS. 2 and 4 as using elastomeric material in the form of a plastic material. However, it will be appreciated, as illustrated at 88 in FIG. 6, that the elastomeric material 31 may be a suitable rubber compound including natural rubber and synthetic rubber.

In this disclosure of the invention, the housing 34 is shown provided with a threaded cap 51; however, it will be appreciated that the housing need not necessarily be provided with a threaded cap but may be provided with any suitable means to close the opposite end of the housing 34. It will also be appreciated that the apparatus of this invention lends itself to easy assembly in that an empty housing 31 may be supported on its end portion 45 followed by installation of the shaft means 36 whereupon a suitable elastomeric material whether in the form of a plastic material or a rubber compound may be poured in position. The threaded cap may then be fastened in position and the entire assembly suitably allowed to set or cure to embed the shaft means 36 in the elastomeric material 31.

In this example of the invention, the elastic properties of the elastomeric material are employed by loading such material so as to place the material in shear. However, it will be appreciated that such material need not necessarily be placed in shear but may be placed in tension or compression by providing and employing suitable components of an apparatus 30, or the like, which cooperate in such a manner that the properties of the elastomeric material may be employed to provide the precisely controlled tensioning action.

In this disclosure of the invention, the shaft means 36 is shown as utilizing a plurality of four spaced fin-like projections or fins 54 which are suitably mechanically fixed in position and the purpose of the fins 54 is to provide an increased amount of area on the shaft means for engagement by the elastomeric material. However, it will be appreciated that such shaft means need not necessarily be provided and that a plain shaft 53 may be suitably fixed or bonded in position by chemical action, mechanical action, or both, or any other suitable technique.

It will also be appreciated that the elastomeric material 31 is suitably fixed in position within the housing 34. In this example of the invention, the elastomeric material 31 is suitably chemically or adhesively bonded against the housing as illustrated at 90 in FIG. 4 by suitable adhesive means 91 applied to the inside of the housing means 34; however, it will be appreciated that the elastomeric material may be fixed or bonded to the housing using any suitable means such as threaded screws, for example, which project through the housing wall and into the elastomeric material as illustrated by dotted lines at 92, for example.

Figure 7:
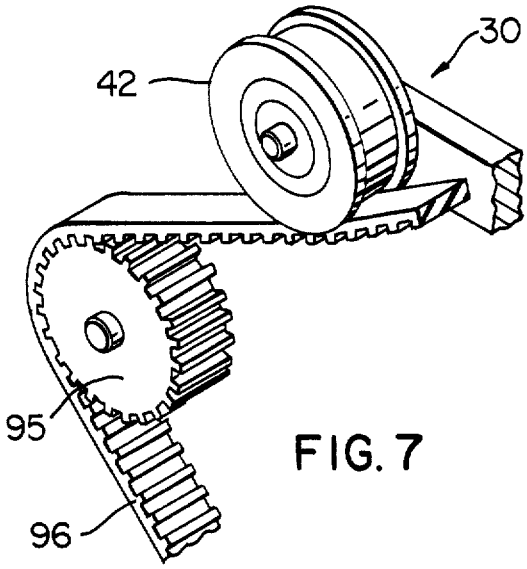
FIG. 7 is a fragmentary perspective view illustrating the belt tensioning apparatus of this invention being utilized with an endless power transmission device in the form of an endless timing belt.

The above description has been made utilizing the belt tensioning apparatus 30 for the purpose of tensioning an endless power transmission device in the form of a belt which is shown being used on an internal combustion engine, such as an automobile engine, for example; however, it will be appreciated that the basic tensioning apparatus of this invention may also be employed in tensioning an endless power transmission device in the form of a timing belt. Thus, FIG. 7 illustrates a suitably toothed wheel or sheave 95 which has a timing belt 96 operatively associated therewith and the belt 96 is particularly adapted to be operatively associated with other parts of an endless system (not shown) and in a manner well known in the art. The timing belt 96 is tensioned by the apparatus 30 of this invention and such apparatus has its belt engaging roller 42 arranged such that it engages the timing belt 96 and provides a controlled tension.

Figure 8:
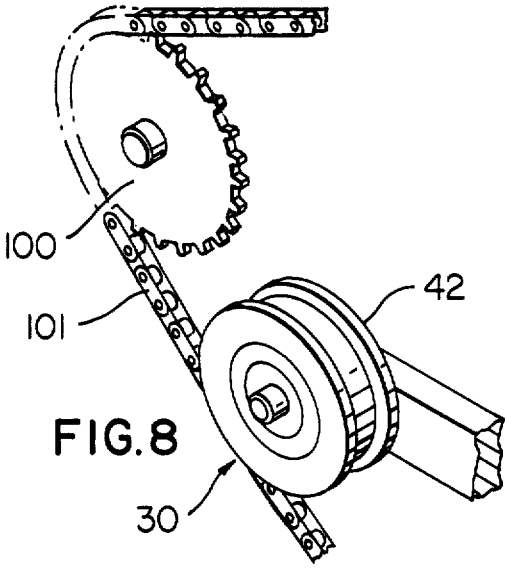
FIG. 8 is a view similar to FIG. 7 illustrating the apparatus of this invention being utilized with an endless power transmission device in the form of an endless sprocket chain.

Reference is now made to FIG. 8 of the drawings which illustrates a typical belt tensioning apparatus 30 of this invention being used to provide a controlled tensioning of an endless power transmission device in the form of a sprocket chain 101. The sprocket chain 101 is operatively associated with a sprocket wheel 100 which together with the chain 101 comprise two components of an endless power transmission system and the remaining components of such an endless system are not shown. The apparatus 30 of FIG. 8 utilizes a sprocket chain engaging roller which is also designated by the reference numeral 42; and, the apparatus 30 provides tensioning of the sprocket chain 101 in a similar manner as previously described in connection with the belt 22 of FIG. 1.

Figure 9:
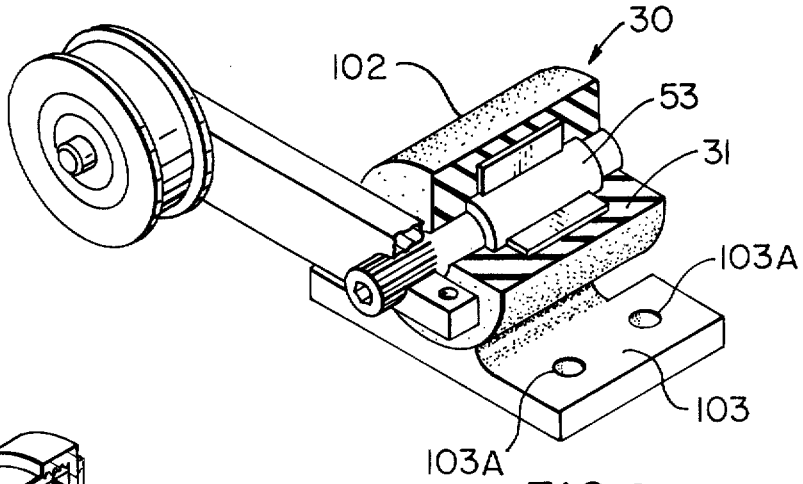
FIG. 9 is a perspective view similar to FIG. 2 illustrating another modification of the belt tensioning apparatus of this invention.

It will also be appreciated that the elastomeric material utilized to provide the tensioning action in the apparatus 30 need not necessarily be confined or disposed within an outer housing. For example, FIG. 9 illustrates elastomeric material which is preshaped or formed in the form of a self supported cylindrical mass and designated by the reference numeral 102. The cylindrical mass 102 with its elastomeric material 31 serves as a matrix for the shaft 53 of the apparatus 30, and it will be seen that the means supporting the elastomeric material or cylindrical mass 102 is a flange 103 defined as an integral part of the cylindrical mass 102 and extending therebeneath. The mass 103 has at least one opening therein and in this example a plurality of two openings 103A and each opening 103A is adapted to receive an associated fastener therethrough to support the flange and elastomeric material adjacent an associated endless device such as the belt 22, timing belt 96, sprocket chain 101, or a similar endless device.

The elastomeric material which is made in the form of a cylindrical mass 102 is cross-hatched in FIG. 9 to indicate that it is a rubber material; however, it will be appreciated that the cylindrical mass 102 may be made of a suitable synthetic plastic material, if desired.

Figure 10:
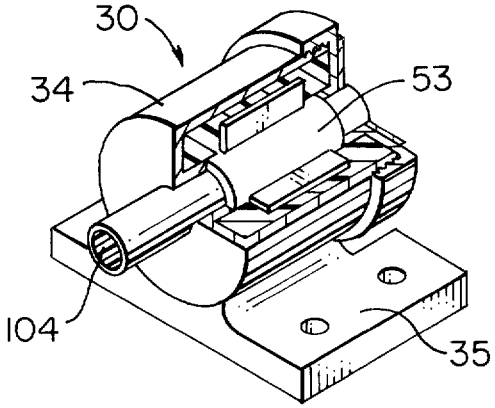
FIG. 10 is a fragmentary perspective view illustrating still another modification of the belt tensioning apparatus of this invention.

The shaft 53 is illustrated in each of FIGS. 2 and 9, for example, as having external splines thereon adapted to receive an associated end portion of a lever which has an internally splined opening therein which receives the external splines of the shaft therethrough. However, it will be appreciated that instead of providing external splines on the shaft 53 of apparatus 30, the shaft 53 may have an internally splined opening 104 therein as shown in the modification of the apparatus 30 shown in FIG. 10. The opening 104 is particularly adapted to receive a cooperating splined portion or member comprising an end portion of a lever adapted to be detachably fastened to the shaft. In this latter type of connection, any suitable means known in the art may be provided to prevent axial movement between the splined member and internally splined opening in the shaft 53.

In this disclosure, the above description of the elastomeric material 31 of the apparatus 30 has been directed to use of the elastic properties thereof to provide a tensioning action; however, the elastomeric material 31 also serves, with great effectiveness, as a vibration dampener thereby reducing the amount of vibration transmitted to the associated endless device whether it be the belt 22, timing belt 96, sprocket chain 101, or similar endless device.

While present exemplary embodiments of this invention, and methods of practicing the same, have been illustrated and described, it will be recognized that this invention may be otherwise variously embodied and practiced within the scope of the following claims.

What is claimed is:

1. [A] *In a* tensioning apparatus for an endless power transmission belt comprising, an elastomeric material, means supporting said elastomeric material adjacent an associated power transmission belt, and means operatively connected between said elastomeric material and said power transmission belt by engaging said elastomeric material and said power transmission belt and employing the elastic properties of said elastomeric material to exert a controlled tensioning force against said endless power transmission belt, *the improvement in which said means operatively connected between said elastomeric material and said belt comprises, shaft means disposed within and fixed against said elastomeric material, said shaft means comprising a shaft having at least one fin-like protrusion fixed thereto and extending radially therefrom, a lever having one end portion fixed to said shaft, and an idler roller engaging said power transmission belt and being carried on said lever, said elastomeric material being displaced from a normal relaxed condition thereof by said roller acting through said lever and shaft means so that the elastomeric material utilizes its elastic properties to transmit a force through said shaft means, lever, and roller to exert said controlled tensioning force against said belt.*

2. An apparatus as set forth in claim 1 in which said elastomeric material is a rubber compound.

3. An apparatus as set forth in claim 1 in which said elastomeric material is a synthetic plastic material.

4. An apparatus as set forth in claim 3 in which said synthetic plastic material is a urethane elastomer.

5. An apparatus as set forth in claim 1 in which said means supporting said elastomeric material comprises a housing containing said elastomeric material and means for supporting said housing.

6. An apparatus as set forth in claim [1 in which said means operatively connected between said elastomeric material and said belt comprises shaft means engaging said elastomeric material by being fixed thereagainst; a lever having one end portion detachably fixed to said shaft means, and belt-engaging means engaging said power transmission belt and being carried on said lever, said elastomeric material being displaced from a normal relaxed condition thereof by said belt-engaging means acting through said lever and shaft means so that the elastomeric material utilizes its elastic properties to transmit a force through said shaft means, lever and belt-engaging means to exert a controlled tensioning force against said belt] *5 in which said housing has an inside surface and said elastomeric material is disposed with its exposed surface against said inside surface, and further comprising means fixing said elastomeric material within said housing.*

7. An apparatus as set forth in claim [6] *1* in which said shaft means *further* comprises [a shaft having] at least [one] *another* fin-like protrusion [extending therefrom, said shaft and its fin-like protrusion being fixed against said elastomeric material by being embedded therein] *fixed to said shaft and extending radially therefrom in angularly spaced relation from said one protrusion, said shaft and its protrusions being embedded within and bonded against said elastomeric material which serves as a matrix therefor.*

8. An apparatus as set forth in claim [6] *1* in which said [belt-engaging means comprises a belt-engaging] roller *is* rotably mounted at the outer end portion of said lever, *said elastomeric material is a self supported mass, and said means supporting said elastomeric material comprises a flange defined as an integral part of said mass and having at least one opening therein, said opening being adapted to receive a fastener therethrough to support said flange and mass of elastomeric material adjacent said belt.*

9. An apparatus as set forth in claim 5 in which said means supporting said elastomeric material further comprises a flange fixed to said housing and having a plurality of openings therein, said openings being adapted to receive fasteners therethrough for fastening said flange and housing into position.

10. An apparatus as set forth in claim [6] *5* in which said elastomeric material is displaced from a normal condition thereof [and placed in a condition of shear] *to provide a shear loading therein* by said ]belt-engaging means] *roller* acting through said lever and shaft means, *and said apparatus further comprises integral means for changing said loading an infinite number of loading values and indicating the amount of said tensioning force applied by said elastomeric material against said belt.*

11. [An] *In an* endless power transmission belt drive system comprising; at least one driving sheave; at least one driven sheave; an endless power transmission belt operatively connected between said sheaves; and a tensioning apparatus for said belt comprising, an elastomeric material, means supporting said elastomeric material adjacent said belt, and means operatively connected between said elastomeric material and said belt by engaging said elastomeric material and said belt and employing the elastic properties of said elastomeric material to exert a controlled tensioning force against said belt, *the improvement in which said means operatively connected between said elastomeric material and said belt comprises, shaft means disposed within and fixed against said elastomeric material, said shaft means comprising a shaft having at least one fin-like protrusion fixed thereto and extending radially therefrom, a lever having one end portion fixed to said shaft, and an idler roller engaging said power transmission belt and being carried on said lever, said elastomeric material being displaced from a normal relaxed condition thereof by said roller acting through said lever and shaft means so that the elastomeric material utilizes its elastic properties to transmit a force through said shaft means, lever, and roller to exert said controlled tensioning force against said belt.*

12. A system as set forth in claim 11 in which said elastomeric material is a rubber compound.

13. A system as set forth in claim 11 in which said elastomeric material is a synthetic plastic material.

14. A system as set forth in claim 13 in which said synthetic plastic material is a urethane elastomer.

15. A system as set forth in claim 11 in which said means supporting said elastomeric material comprises a housing containing a mass of said elastomeric material and means for supporting said housing.

16. A system as set forth in claim [11 in which said means operatively connected between said elastomeric material and said belt comprises shaft means engaging said elastomeric material by being fixed thereagainst, a lever having one end portion detachably fixed to said shaft means, and belt-engaging means engaging said power transmission belt and being carried on said lever, said elastomeric material being displaced from a normal relaxed condition thereof by said belt-engaging means acting through said lever and shaft means so that the elastomeric material utilizes its elastic properties to transmit a force through said shaft means, lever, and belt-engaging means to exert a controlled tensioning force against said belt] *15 in which said housing has an inside surface and said elastomeric material is disposed with its exposed surface against said inside surface, and further comprising means fixing said elastomeric material within said housing.*

17. A system as set forth in claim [16] *11* in which said shaft means *further* comprises [a shaft having] at least [one] *another* fin-like protrusion [extending therefrom, said shaft and its fin-like protrusion being fixed against said elastomeric material by being embedded therein] *fixed to said shaft and extending radially therefrom in angularly spaced relation from said one protrusion, said shaft and its protrusions being embedded within and bonded against said elastomeric material which serves as a matrix therefor.*

18. A system as set forth in claim [16] *11* in which said [belt-engaging means comprises a belt-engaging] roller *is* rotatably mounted at the outer end portion of said lever, *said elastomeric material is a self supported mass, and said means supporting said elastomeric material comprises a flange defined as an integral part of said mass and having at least one opening therein, said opening being adapted to receive a fastener therethrough to support said flange and mass of elastomeric material adjacent said belt.*

19. A system as set forth in claim 15 in which said means supporting said elastomeric material further comprises a flange fixed to said housing and having a plurality of openings therein, said openings being adapted to receive fasteners therethrough for fastening said flange and housing into position.

20. A system as set forth in claim [16] *11* in which said elastomeric material is displaced from a normal condition thereof [and placed in a condition of shear] *to provide a shear loading therein* by said [belt-engaging means] *roller* acting through said lever and shaft means, said elastomeric material also serves [serving] as vibration-dampening means, *and said apparatus further comprises integral means for changing said loading an infinite number of loading values and indicating the amount of said tensioning force applied by said elastomeric material against said belt.*

21. [A] *In a* tensioning apparatus for an endless power transmission device comprising, an elastomeric material, means supporting said elastomeric material adjacent an associated power transmission device, and means operatively connected between said elastomeric material and said power transmission device by engaging said elastomeric material and said power transmission device and employing the elastic properties of said elastomeric material to exert a controlled tensioning force against said endless power transmission device, *the improvement in which said means operatively connected between said elastomeric material and said device comprises, shaft means disposed within and fixed against said elastomeric material, said shaft means comprising a shaft having at least one fin-like protrusion fixed thereto and extending radially therefrom, a lever having one end portion fixed to said shaft, and an idler roller engaging said power transmission device and being carried on said lever, said elastomeric material being displaced from a normal relaxed condition thereof by said roller acting through said lever and shaft means so that the elastomeric material utilizes its elastic properties to transmit a force through said shaft means, lever, and roller to exert said controlled tensioning force against said device.*

22. In *a* combination [:] *comprising* an endless power transmission device and a tensioning apparatus for said endless power transmission device, said apparatus comprising, an elastomeric material, means supporting said elastomeric material adjacent said device, and means operatively connected between said elastomeric material and device by engaging said elastomeric material and said device and employing the elastic properties of said elastomeric material to exert a controlled tensioning force against said device, *the improvement in which said means operatively connected between said elastomeric material and said device comprises, shaft means disposed within and fixed against said elastomeric material, said shaft means comprising a shaft having at least one fin-like protrusion fixed thereto and extending radially therefrom, a lever having one end portion fixed to said shaft, and an idler roller engaging said power transmission device and being carried on said lever, said elastomeric material being displaced from a normal relaxed condition thereof by said roller acting through said lever and shaft means so that the elastomeric material utilizes its elastic properties and to transmit a force through said shaft means, lever, and roller to exert said controlled tensioning force against said device.*

23. A combination as set forth in claim 22 in which said device comprises a sprocket chain.

24. A combination as set forth in claim 22 in which said device comprises a timing belt.

25. A combination as set forth in claim 22 in which [said means operatively connected between said elastomeric material and said device comprises a shaft engaging said elastomeric material by being embedded therein,] said elastomeric material [being] *is* in the form of a self supported [cylindrical] mass [serving as a matrix for said shaft,] *and* said means supporting said elastomeric material comprises a flange defined as an integral part of said [cylindrical] mass and having at least one opening therein, said opening being adapted to receive a fastener therethrough to support said flange and elastomeric material adjacent said device[, a lever having one end portion detachably fixed to said shaft, and device-engaging means engaging said device and being carried on said lever, said elastomeric material being displaced from a normal relaxed condition thereof by said device-engaging means acting through said lever and shaft so that the elastomeric material utilizes its elastic properties to transmit a force through said shaft, lever, and device-engaging means to exert a controlled tensioning force against said device].

26. A combination as set forth in claim [25] *22* in which said shaft has external splines thereon, and said one end portion of said lever has an internally splined opening therein which receives said external splines of said shaft therethrough.

27. A combination as set forth in claim [25] *22* in which said shaft has an internally splined opening therein which is adapted to receive a cooperating splined [member] *portion* comprising said one end portion of said lever.

28. A combination as set forth in claim 22 in which said elastomeric material is a rubber compound.

29. A combination as set forth in claim 22 in which said elastomeric material is a synthetic plastic material.

30. A combination as set forth in claim 29 in which said synthetic plastic material is a urethane elastomer.

*31. An apparatus as set forth in claim 1 in which said elastomeric material is defined as a mass having opposed ends, said fin-like protrusion has opposed end edges, and said protrusion is embedded within and bonded against said elastomeric material which serves as a matrix therefor with the end edges of said protrusion being disposed axially inwardly of the opposed ends of said elastomeric material, said protrusion assuring that said shaft means and mass of elastomeric material are prevented from relative movement therebetween including both relative rotary as well as relative axial movement.*

*32. An apparatus as set forth in claim 1 in which said elastomeric material is defined as a substantially tubular mass which has a particular wall thickness and is disposed outwardly of said shaft, and said fin-like protrusion has a radial dimension which extends through the major part of said wall thickness.*

*33. In a tensioning apparatus for an endless power transmission device comprising, an elastomeric material, means supporting said elastomeric material adjacent an associated power transmission device, and means operatively connected between said elastomeric material and said power transmission device by engaging said elastomeric material and said power transmission device and employing the elastic properties of said elastomeric material to exert a controlled tensioning force against said endless power transmission device, the improvement in which said elastomeric material is a self supported mass and said means supporting said elastomeric material comprises integral flange means adapted to be used in fastening said mass of elastomeric material adjacent said device.*

* * * * *